(12) United States Patent
Latouche et al.

(10) Patent No.: US 11,548,046 B2
(45) Date of Patent: Jan. 10, 2023

(54) METHOD FOR LASER STRIPPING A MOVING METAL PRODUCT AND PLANT FOR THE EXECUTION THEREOF

(71) Applicant: APERAM, Luxembourg (LU)

(72) Inventors: Baptiste Latouche, Lille (FR); Ismael Guillotte, Verquin (FR); Antonin Marissael, Lille (FR); Ward Neven, Diepenbeek (BE); Jean-Michel Damasse, Lomme (FR)

(73) Assignee: APERAM, Luxembourg (LU)

( * ) Notice: Subject to any disclaimer, the term of this patent is extended or adjusted under 35 U.S.C. 154(b) by 902 days.

(21) Appl. No.: 16/463,678

(22) PCT Filed: Nov. 23, 2016

(86) PCT No.: PCT/IB2016/057064
§ 371 (c)(1),
(2) Date: May 23, 2019

(87) PCT Pub. No.: WO2018/096382
PCT Pub. Date: May 31, 2018

(65) Prior Publication Data
US 2021/0114072 A1 Apr. 22, 2021

(51) Int. Cl.
*B21C 43/04* (2006.01)
*B23K 26/361* (2014.01)
(Continued)

(52) U.S. Cl.
CPC .............. *B21C 43/04* (2013.01); *B21C 51/00* (2013.01); *B23K 26/032* (2013.01);
(Continued)

(58) Field of Classification Search
CPC .... B23K 26/38; B23K 2103/04; B23K 26/40; B23K 26/0846; B23K 26/032; B23K 26/361; B21C 51/00; B21C 43/04
(Continued)

(56) References Cited

U.S. PATENT DOCUMENTS

| 4,588,885 A | * | 5/1986 | Lovoi | B08B 7/0042 134/1 |
| 5,197,179 A | * | 3/1993 | Sendzimir | C21D 8/0205 29/527.4 |

(Continued)

FOREIGN PATENT DOCUMENTS

| CN | 1048339 A | 1/1991 |
| CN | 201223863 Y | 4/2009 |

(Continued)

OTHER PUBLICATIONS

International Search Report, dated Aug. 17, 2017, from corresponding PCT application No. PCT/IB2016/057064.

*Primary Examiner* — Jimmy Chou
(74) *Attorney, Agent, or Firm* — Nixon & Vanderhye (57) ABSTRACT

A laser descaling device and process includes a first laser sending a ray to the product to be descaled, reflected rays being intercepted by sensors that send collected information into a processing unit that calculates the absorption of the ray by the surface of the product, deduces the emissivity of the oxidized surface in the direction of the reflected rays, and correlates this emissivity with reference information prerecorded inside the processing unit; a second laser sends a ray onto the surface of the product, the spots of the rays covering the entire surface to be descaled, the second laser being controlled by a control unit receiving information provided by the processing unit making it possible to determine the operating parameters to be imposed on the second laser to (Continued)

obtain the descaling of the surface of the product, compared with experimental results prerecorded in the control unit.

20 Claims, 1 Drawing Sheet

(51) Int. Cl.
    *B23K 26/70* (2014.01)
    *B21C 51/00* (2006.01)
    *B23K 26/03* (2006.01)
    *B23K 26/08* (2014.01)
    *B23K 26/40* (2014.01)
    *B23K 103/04* (2006.01)
    *B23K 101/16* (2006.01)

(52) U.S. Cl.
    CPC ........ *B23K 26/0846* (2013.01); *B23K 26/361* (2015.10); *B23K 26/40* (2013.01); *B23K 26/702* (2015.10); *B23K 2101/16* (2018.08); *B23K 2103/04* (2018.08)

(58) Field of Classification Search
    USPC ...... 219/121.67, 121.6, 121.81; 356/73, 369, 356/430, 431; 72/39
    See application file for complete search history.

(56) References Cited

U.S. PATENT DOCUMENTS

| | | | | |
|---|---|---|---|---|
| 5,204,517 A * | 4/1993 | Cates | ................... | B23K 26/705 134/1 |
| 5,554,235 A * | 9/1996 | Noe | ..................... | C21D 8/0205 29/81.08 |
| 5,736,709 A * | 4/1998 | Neiheisel | ............. | B23K 26/123 219/121.75 |
| 5,948,172 A | 9/1999 | Neiheisel | | |
| 5,986,234 A * | 11/1999 | Matthews | .......... | B23K 26/1476 219/121.68 |
| 6,211,485 B1 * | 4/2001 | Burgess | ............... | B23K 26/389 219/121.7 |
| 6,227,436 B1 * | 5/2001 | Nishikawa | ........... | B23K 1/0016 228/205 |
| 10,112,257 B1 * | 10/2018 | Thomas | ............... | B23K 26/361 |
| 10,759,004 B2 * | 9/2020 | Thayer | ............... | B23K 26/0624 |
| 2005/0150878 A1 * | 7/2005 | Thomas | ................. | B23K 26/40 219/121.68 |
| 2007/0000885 A1 * | 1/2007 | Thomas | ............... | B08B 7/0042 219/121.68 |
| 2007/0170162 A1 * | 7/2007 | Haupt | .................... | B23K 26/40 219/121.72 |
| 2009/0002686 A1 * | 1/2009 | Voges | .................... | G01N 21/94 356/73 |
| 2009/0007933 A1 * | 1/2009 | Thomas | ............... | B23K 26/361 219/121.81 |
| 2011/0019278 A1 * | 1/2011 | Aoki | .................... | H05K 9/0096 359/585 |
| 2011/0095003 A1 * | 4/2011 | Sakurai | .............. | B23K 26/0617 219/121.64 |
| 2013/0206739 A1 * | 8/2013 | Reed | .................. | B23K 26/0622 219/121.71 |
| 2017/0120380 A1 * | 5/2017 | Zhang | .................... | G02B 27/09 |

FOREIGN PATENT DOCUMENTS

| | | | |
|---|---|---|---|
| CN | 102452032 A | 5/2012 | |
| CN | 103317240 A | 9/2013 | |
| CN | 104162744 A | 11/2014 | |
| CN | 204843267 U | 12/2015 | |
| DE | 3705603 C1 | 1/1988 | |
| EP | 0509177 A2 | 10/1992 | |
| EP | 0695808 A1 | 2/1996 | |
| EP | 0927595 A1 | 7/1999 | |
| FR | 2641718 A1 | 7/1990 | |
| FR | 2703618 A1 | 10/1994 | |
| FR | 2 703 618 B1 | 6/1995 | |
| FR | 2703618 B1 | 6/1995 | |
| JP | 59-40548 A | 3/1984 | |
| JP | 59040548 A * | 3/1984 | ......... H01L 23/5254 |
| JP | 11-269683 A | 10/1999 | |
| JP | 2011-519175 A | 6/2011 | |
| JP | 2016-078048 A | 5/2016 | |
| RU | 2445175 C1 | 3/2012 | |
| RU | 2514233 C2 | 4/2014 | |
| RU | 2538161 C2 | 1/2015 | |
| TW | 303313 B | 4/1997 | |
| TW | 200625291 A | 7/2006 | |

* cited by examiner

METHOD FOR LASER STRIPPING A MOVING METAL PRODUCT AND PLANT FOR THE EXECUTION THEREOF

BACKGROUND OF THE INVENTION

Field of the Invention

The present invention relates to the removal of the layer of oxides that covers a metal product, in particular made from steel, after the latter has been exposed to an oxidizing atmosphere for some of its components, for example after staying in a thermal treatment furnace.

In the continuation of the text, the favored example application of the invention will be to the field of stainless steel strips and sheets in all categories (austenitic, ferritic, austenitic-ferritic, etc.), stationary or in motion, rolled or shaped hot or cold. However, it must be understood that this will absolutely not be limiting, and that the invention may apply to other metals for which technical problems arise similar to those encountered on the stainless steel strips and sheets, in particular various classes of carbon steels, and special alloys, in particular ferrous alloys. It may also apply to products other than strips and sheets, for example wires and tubes with and without welding, with adaptations of the described devices that would be obvious for one skilled in the art.

It is typical for stainless steel sheets and strips to undergo treatments that lead to a layer of unwanted oxides forming at high temperatures on their surfaces, in contact with an oxidizing atmosphere such as air. These oxides have a composition that varies substantially based on the composition of the base metal and conditions of their formation. Most typically, the oxides of the elements Fe, Cr, Mn and Si are preponderant therein.

The treatments that lead to this formation are typically, and non-limitingly, the reheating operations undergone by a semi-finished product (ingot, slab, bloom, billet) before it is hot rolled and stays in the open air, which it does after hot rolling, the various annealing operations at several hundred degrees undergone by the strip or sheet before and/or during and/or after its cold rolling cycle (the latter being done in one or several steps, some of which may be separated by intermediate annealing), if these annealing operations take place in an atmosphere that is not perfectly inert or reducing. These unwanted oxides must of course be eliminated, before the sheet or strip becomes a usable product or semi-finished product ready to undergo the final shaping operations that will make it a usable product. It is also often important to eliminate these oxides before the first cold rolling step, to prevent them from becoming inlaid in the surface of the semi-finished product during rolling and leading to a mediocre surface condition.

It must be understood that the layer of unwanted oxides mentioned here is not the fine Cr oxide-based layer (called "passive layer") that forms spontaneously in the air and at ambient temperature on the surface of stainless steels, and which protects them from oxidation. The oxide layer that poses problems, and that one wishes to eliminate, is that which forms when the strip stays at a high temperature in an oxidizing atmosphere. Once this layer is removed, the surface of the stainless steel is naked and the passive protective layer of Cr oxides can form again, quickly and spontaneously, making the steel once again stainless under typical usage conditions.

The use of mechanical descaling by shot peening (projection of hard beads on the surface to be treated) and/or by a scale breaker (passage of the strip between pairs of rollers that cause it to work in flexion, compression and traction) makes it possible to crack and remove easily, for example by brushing, a large portion of the oxides, but may be insufficient to remove all of them. Shot peening also has the drawback of increasing the roughness of the surface, which the operations subsequently undergone by the sheet or strip do not necessarily make it possible to correct when this is not desired.

Most traditionally, the unwanted layer of oxides is removed using a chemical or electrolytic pickling method, or a series of such pickling operations.

Chemical pickling is done in one or several hydrofluoric, hydrochloric, sulfuric or nitric acid baths. Electrolytic pickling is typically done in a sodium sulfate bath or an acid bath (nitric or sulfuric).

These descaling operations lead to obtaining a strip or sheet having a surface finish that is typically classified in various categories subject to standards:

1D Finish, for products having undergone hot rolling, annealing and descaling, generally chemical pickling; mechanical descaling (scale breaker, shot peening) is generally also used upstream from the chemical pickling;
 2B Finish, for products having undergone annealing, generally electrolytic and chemical pickling and a skin-pass (in a skin pass rolling mill that improves the flatness of the strip and decreases its roughness, with a low reduction rate in the thickness of the product of about some % in principle);
 2D Finish for cold-rolled products having undergone annealing, pickling and no skin-pass;
 2E Finish for cold-rolled products having undergone annealing, shot peening, pickling and no skin-pass.

Chemical pickling is the most radical method for eliminating unwanted oxides. However, it has many drawbacks.

It consumes high quantities of acids, also with very low possibilities for recovering a portion thereof for subsequent reuse.

The infrastructure necessary for its performance, namely successive pickling baths and the like, are costly and cumbersome. It is not uncommon to encounter chemical pickling devices for moving strips having a length of about 200 m.

These devices use hazardous products, in particular hydrofluoric acid. Their liquid and solid polluting waste (sludge containing oxides mixed with pickling liquids) must be stored and retreated according to strict regulations, the severity of which will only increase in the future, which is costly. The acid baths, heated, also give off acid fumes that must be neutralized. Nitric acid is also a source of $No_x$ releases that must be captured and treated.

Electrolytic pickling methods are also used, done while the strip or sheet is submerged in a bath, generally with a base of sodium sulfate, or nitric or sulfuric acid, which must also be retreated after use. Electrolytic pickling requires a fairly expensive device using a relatively high quantity of electricity. It may be completed by chemical pickling with acid, lighter than when chemical pickling alone is used, but which has the same type of drawbacks as those set out above. Electrolytic pickling also produces sludge that must be stored, then retreated. The used baths must also be retreated. Retreating sludge and the baths is less expensive, hazardous and complex than in the case of chemical pickling by acid baths, but nevertheless also constitutes a very significant constraint in the use of the method.

Lastly, the presence of hexavalent chrome in solution in the pickling liquids represents a major health risk for staff and the environment: its content level in liquids and staff exposure are measured and monitored.

One has therefore examined the possibilities for replacing, at least in some cases, chemical or electrolytic pickling of metal products with methods using a laser. The classic work "Laser Cleaning" (Boris Luk'yanchuk, December 2002, ISBN: 978-981-02-4941-0) mentions such possibilities, in particular for cleaning works of art and buildings (in particular chapter 2 "an overview of experimental research into the laser cleaning of contaminants from surfaces"), therefore for stationary services with relatively small sizes. The laser radiation is projected on the surface to be cleaned and causes the oxide layer to be detached.

In this way, it is possible to avoid using acids and/or sulfates, and there is no hazardous retreatment of polluting sludge and liquids to be done. It is necessary only to collect the detached oxides, for example by suction, and it is possible to retreat them, preferably using a dry method, to recover the metals that they contain and exploit them. The safety of environment of the workshop is better ensured. The entire operation for cleaning the surface using a laser also has a better overall energy balance than the wet method (chemical and/or electrolytic), particularly given that the electricity cost to operate the lasers is not very high, in particular relative to what is needed for electrolytic descaling. The device may be significantly more compact than a pickling device including several successive baths, resulting in clear advantages with respect to the cost of civil engineering operations during construction of the device. If pulsed fiber lasers are used, it is possible to send large quantities of energy in a very short period of time, at a high frequency and with considerable autonomy, and the lifetime of these lasers can reach several years without any particular upkeep.

However, the use of the existing technologies, coupled with $CO_2$, excimer or Nd:YAG lasers, does not make it possible to obtain optimum results on moving strips or sheets with an industrial format, due to heavy maintenance, an operating mode of the lasers that is continuous or uses overly long pulses and an excessive operating cost due to the number of lasers used, in light of the high movement speed of the current lines. Furthermore, the solutions provided are solutions assuming a homogenous surface state along the width and length of the strip (see document EP 0,927,595-A1) and, most often, a fixed movement speed. On the same strip, if the movement speed were to change for a specific reason, the inertia of the machines, and primarily that of the furnace, causes a modification (in thickness and/or nature) of the oxide layer. Even if the nature and the thickness of the oxide layer to be removed were considered to be known beforehand, they are then modified and an adaptation of the frequency or energy of the pulses based on the speed only works if the oxide layer does not change (which is generally not the case). Lastly, the line speeds now reach approximately 100-150 m/min. If one wishes to descale a strip that is 2 m wide traveling at this speed, the current scanners scanning the surface are limited by the speed of their motors, which is much lower than the speed that would be necessary to avoid scanning over a very small distance involving a row of hundreds of lasers in the width of the sheet. For example, with a Nd:YAG 1064 mm, 1 mJ laser, having a spot measuring 0.120 mm per side, if one wishes for the entire treated area to have been touched by at least one laser pulse during descaling, the scanner must return to its starting point when the strip is moved by 0.120 mm, and the device would then have to contain hundreds of lasers.

The aim of the invention is to propose a descaling device for metal products, in particular in the form of moving strips from coils of hot or cold rolled sheets, bars, wires, or tubes with or without welding, making it possible to best exploit the laser descaling possibilities of these metal products on an industrial scale. This device must be as versatile as possible while making it possible to treat products made from steels with various compositions, various oxidation states, various formats and thicknesses (for the strips and sheets), the products being able to be moving in the laser descaling device at various speeds.

To that end, the invention relates to a method for laser descaling of a moving metal product having an oxide layer on its surface, said method using laser descaling, characterized in that:

at least a first laser with a wavelength equal to that of the lasers used for the descaling, or preferably a group of such first lasers, each send a ray that is reflected on the oxidized surface of the product to be descaled, said rays reflected by the oxidized surface being intercepted by sensors that send the information they collect into a processing unit;

a processing unit calculates the absorption of the ray by the surface of the product, from information collected by the sensors, deduces the emissivity of the oxidized surface of the metal product therefrom in the direction of said reflected rays, and correlates this emissivity with reference information prerecorded inside processing unit;

at least one second laser, or preferably a group of such second lasers, each send pulses from a ray onto the surface of the product to descale it, the spots of said pulses of said rays covering the entire surface to be descaled using optical and/or mechanical scanning laterally moving the spots of the rays on the surface of the product, or an optical system transforming the spots into lines, said second laser(s) being controlled by a control unit receiving information provided by the processing unit making it possible to determine the operating parameters to be imposed on said second lasers to obtain the descaling of the surface of the product, compared with experimental results prerecorded in the control unit;

and means for inspecting the descaled surface of the product verifying the effectiveness of the descaling by detecting any persistence of areas that have not been descaled, or that have been descaled poorly.

The fluence of the spot of each pulse of said at least one second laser can be comprised between 1 and 20 $J/cm^2$.

The information prerecorded in the processing unit may include the composition of the product and the roughness, measured or estimated, of its surface.

After the descaling and before the inspection of the surface, it is possible to discharge the descaled oxides from the surface of the product, for example by suction and/or brushing.

After inspecting the surface of the product, it is possible to perform additional descaling of the product, at least in the areas for which the inspection has shown that the descaling by the second laser(s) was insufficient.

Said additional descaling may be carried out by at least one third laser or a group of such third lasers, according to information provided by said surface inspection means.

It is possible to verify, by second inspection means, such as optical means, the effectiveness of said additional descaling.

The product, after the additional descaling and optionally the detection of areas imperfectly descaled by the second inspection means, can be sent into at least one chemical or electrolytic pickling bath.

Said additional descaling can also be done using at least one chemical or electrolytic pickling bath.

Said moving metal product can be a strip or a sheet, and it is descaled on both faces of said strip or sheet.

The invention also relates to a device for laser descaling of a moving metal product, characterized in that it includes:
- at least one first laser with a wavelength equal to that of the lasers used for the descaling, or preferably a group of such first lasers, each sending a ray that is reflected on the oxidized surface of the product to be descaled, and sensors that intercept the rays reflected by said oxidized surface and send the information they collect into a processing unit;
- a processing unit that calculates the absorption of the ray by the surface of the product, from information collected by the sensors, and that deduces the emissivity of the oxidized surface of the metal product, and correlates this emissivity with reference information prerecorded inside processing unit;
- at least one second laser, or preferably a group of such second lasers, that each send a ray onto the surface of the product to descale it, the spots of said rays being able to cover the entire surface to be descaled using optical and/or mechanical scanning systems laterally moving the spots of the rays on the surface of the product, or an optical system and transforming the spots into lines, and a control unit controlling said second laser(s) and receiving information provided by the processing unit making it possible to determine the operating parameters to be imposed on said second lasers to obtain the descaling of the surface of the product, compared with experimental results prerecorded in the control unit, and controlling said second lasers by imposing said operating parameters on them;
- and means for inspecting the descaled surface of the product verifying the effectiveness of the descaling by detecting any persistence of areas that have not been descaled, or that have been descaled poorly.

Said means for inspecting the descaled surface of the product can be optical means.

Said device may include means for discharging the descaled oxides from the surface of the product, for example by suction and/or brushing.

It may include means for performing additional descaling placed downstream from said means for inspecting the descaled surface of the product.

Said means for performing additional descaling include at least one third laser or a group of such third lasers, operating according to information provided by said means for inspecting the surface.

Said means for performing additional descaling may include at least one chemical or electrolytic pickling bath.

The laser descaling device may be placed on a continuous treatment line also including a furnace placed before it.

Said continuous line may include a rolling device for the metal product.

To treat both faces of said metal product, which consists of a moving strip or sheet, the device may include, on either side of said product, at least one first laser, at least one second laser, and means for inspecting each surface of said product.

To treat the entire surface of said metal product, which consists of a bar, a tube or a wire, the device may include, distributed near the periphery of said metal products, a group of first lasers, a group of second lasers, and means for inspecting the entire surface of said product.

As will be understood, the invention consists of performing laser descaling of a metal product with any format using a versatile device, providing multiple instruments for inspecting the effectiveness of the descaling and making it possible to optimize the latter during the performance of the descaling treatment itself.

Figure 1:
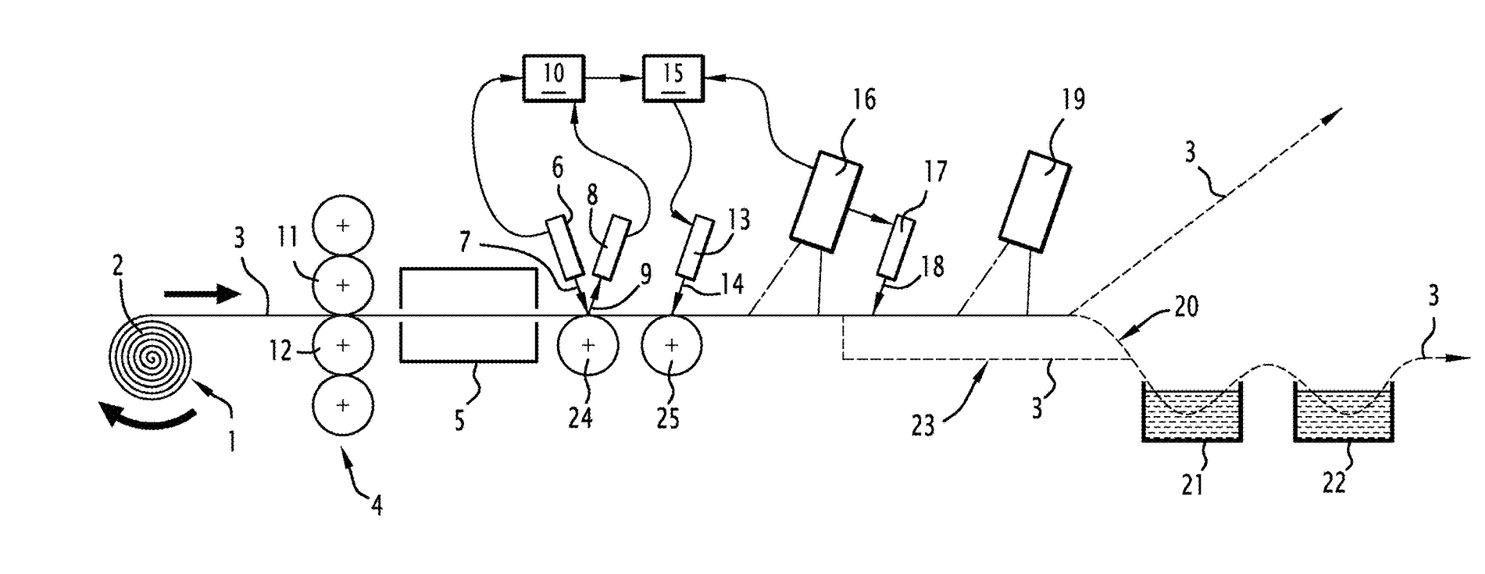
FIG. 1 schematically shows a profile view of an example device according to the invention for laser descaling of a moving metal strip, with possible alternative embodiments.

The invention will be better understood upon reading the following description, given in reference to the appended FIGURE, which schematically shows a profile view of an example device according to the invention for laser descaling of a moving metal strip, with possible alternative embodiments.

The laser descaling devices that will be described in detail and illustrated by examples will refer to the treatment of a moving cold-rolled stainless steel strip, having just undergone cold rolling and annealing on a continuous line, and the laser descaling device according to the invention, which performs at least the majority of this descaling function, is also incorporated into this continuous line, replacing the electrolytic and/or chemical pickling devices typically used on this type of continuous line (examples of such continuous lines may in particular be found in documents EP 0,509,177-A2 and EP 0,695,808-A1).

Of course, the laser descaling device according to the invention that will be described may also be incorporated into a continuous treatment line including a bigger or smaller number of apparatuses than what will be described, or may be subject to a separate device especially dedicated to this descaling.

Additionally, the apparatuses typically present on such lines that do not play a major metallurgical role, and in any case, do not participate as such in performing the laser descaling done according to the invention, have not been shown. Examples in particular include pinch rolls for setting the strip in motion, and strip accumulators that serve as "buffers" between some of the apparatuses that may each require a different movement speed of the strip.

DETAILED DESCRIPTION OF THE PREFERRED EMBODIMENTS

The illustrated continuous line first includes an unwinding device 1 for a coil 2 of a strip 3 of hot-rolled stainless steel having a thickness typically of around several mm and the width of which may typically reach up to 2 m. This strip 3 is made to travel at a speed typically reaching up to 150 m/min, and, generally after having been descaled by any chemical and/or mechanical means, not shown, or even by laser with means according to the invention as will be described, it enters a cold-rolling mill 4, which reduces its thickness to a value typically from about 0.2 to 15 mm in order to obtain the cold-rolled strip.

The cold-rolled strip 3 next enters an annealing furnace 5, where it is brought to a temperature of several hundred ° C., which depends on the metallurgical objectives of the annealing. If this annealing is done (deliberately or accidentally) in the presence of a non-negligible quantity of an oxidizing gas such as oxygen, it leads to the formation of a layer of unwanted oxides on the surface of the strip 3, the composition, thickness and adherence of which on the strip 3 in particular depend on the composition of the strip 3, the composition of the atmosphere of the furnace 5, the temperature in the furnace 5, the residence time of the strip 3 in the furnace 5. In light of these many parameters, not all of which are easy to control and which, in any case, may vary substantially depending on the exact treatment done (in particular the composition of the strip 3 and the annealing conditions), it is not possible to assign precise systematic characteristics to this layer of oxides that would allow easy standardization of the descaling conditions of the strip 3. This is also one of the drawbacks of the wet descaling methods, in particular chemical methods, for which the composition of the baths cannot easily be adapted to what would actually be necessary to obtain satisfactory descaling of the strip 3 at a lower cost.

According to the invention, after the annealing furnace 5, positioned on the line, and on each face of the strip 3, is a first row of lasers 6 with a wavelength equal to that of the lasers that will be used for the descaling (for example Nd:YAG lasers with a wavelength of 1064 nm), whereof the spots of the rays 7 on the strip 3 can ideally cover the entire width of the strip 3 while overlapping as little as possible. The location of these spots can optionally vary using a system for scanning the surface similar to that which will be described for the lasers 13 performing the descaling, such that the spots of the first lasers 6 cover all or a large part of the surface of the strip without an excessive number of first lasers 6 being necessary. This first row of lasers 6 is associated with a series of sensors 8 on which the rays 9 coming from the reflection of the rays 7 on the oxidized surface of the strip 3 are returned. The first lasers 6 must therefore be placed with a known incidence angle in order to recover, using the sensors 8, the information with the correct reflection angle. An appropriate processing unit of the signal 10 programmed traditionally is used to compare the intensities of the rays 9 received by each of the sensors 8 with reference intensities according to said reflection angle, pre-recorded in said processing means 10, for a stripped, or oxidized in a standard manner, strip, and which would have the same composition and the same roughness as the treated strip 3. This makes it possible to determine the spectral emissivity, for this given wavelength and in the considered direction, of the surface of the strip 3 in the relevant area, which is correlated to the degree of absorption of the rays 7 coming from each of the first lasers 6.

The aim of the first lasers 6 is to determine the actual energy necessary for descaling along the width of the strip and along the length of the moving strip. Indeed, it is possible, due to deliberate or experienced variations of the operating parameters upstream from the line, for example slowing, accelerations of the strip on the line, or heterogeneous pollution over the width of the strip 3 that has occurred in the furnace 5 or before the latter, to obtain a heterogeneous oxide layer over the length and/or the width of the strip 3 to be descaled. The first lasers 6 and the corresponding sensors 8 make it possible to quantify this heterogeneity.

The fact that the wavelength of the first lasers 6 is the same as that of the descaling lasers makes it possible to ensure that the absorptions of the rays from the first lasers 6 by the oxides covering the strip 3 will be the same as for the descaling lasers, and that the adjustments of the descaling lasers may therefore be based directly on the data obtained by the first lasers 6 and the sensors 8.

To obtain a reliable measurement of the absorption of the first lasers 6, the strip 3 must retain a constant distance with respect to the first lasers 6 and the sensors 8, i.e., the strip 3 must not oscillate and must remain at a fixed height. This may be done by applying substantial enough traction to the strip 3 using S-shaped blocks or by placing a support roll 24 below the strip 3 ensuring that its height remains fixed under the first lasers 6.

For simplification reasons, FIG. 1 shows first lasers 6, their sensors 8 and their associated support rolls 24 only on the upper face of the strip 3. However, other lasers and their associated sensors are of course also present on the lower surface of the strip 3. Likewise, a support roll comparable to the roll 24 may be placed in contact with the upper surface of the strip 3 to ensure that the strip 3 retains a fixed distance relative to the lasers that inspect its lower surface.

Since the actual roughness of the strip 3 is difficult to measure in the case where the strip 3 is moving, it is possible to adopt the hypothesis that this roughness is the same as that of the surfaces of the work cylinders 11, 12 of the cold-roller 4, which in principle is known due to the fact that these cylinders 11, 12 are regularly inspected and, if necessary, resurfaced so that they indeed do not impose any excessive or uncontrolled roughness on the surfaces of the strip 3 during rolling. It will often be sufficient to assess this roughness on only one of the work cylinders 11, 12, since normally, their roughness evolves similarly during their use, but it is also possible to choose not to assume a priori the sameness of the roughness of the cylinders 11, 12 and to evaluate both of them separately. In the context of hot-rolling, the roughness may also be inspected in comparison with measurements done beforehand outside the descaling line on these products or similar products.

It should be noted that if the product to be treated is different from a moving strip 3 unwound from a coil 2 (for example if it involves a sheet already cut and rolled), and if it is possible to evaluate its actual roughness before it enters the annealing furnace 5, then the measurement of the emissivity of the oxidized product to be treated can be based on this actual roughness.

Next, the strip 3 moves in front of a second row of lasers 13 (for example, Nd:YAG pulsed lasers, 1064 nm) each sending a ray 14 onto the surface of the strip 3.

These lasers 13 of the second row are those which are actually responsible for the descaling strictly speaking. They occupy positions on the transverse direction of the strip 3 that make each of them optimally substantially across from one of the lasers 6 of the first row. They are controlled by a control unit 15 that determines what their various operating parameters should be based on:

Results of emissivity measurements of the surface of the strip 3 procured by the first lasers 6, the sensors 8 and the processing unit 10 of information that they provide and that is transmitted to the control unit 15 of the lasers 13 of the second row;

And experimental results pre-saved in the control unit 15 that make it possible to determine, from calibrations done beforehand on reference samples with a composition, roughness and emissivity identical or close to those of the strip 3 to be treated, what the most appropriate parameters will be for the operation of each of the descaling lasers 13, based in particular on the emissivity measured in the area of the strip 3 that it can reach, to achieve satisfactory descaling of the strip.

Of course, the processing unit 10 and the control unit 15 can be grouped together in a single apparatus able to perform all of the functions of both units 10, 15 itself.

In the same manner as for the lasers 6 and sensors 8, the strip 3 must retain a fixed height during the passage below the lasers 13, and a support roll 25 comparable to the prior support 24, or any other functionally equivalent device, can be used to that end.

Additionally, other lasers 13, not shown, and any associated support roll, are provided to descale the lower surface of the strip 3, based on information provided by the lasers 6, not shown, which inspect said lower surface.

The lasers 13 can each be placed non-perpendicularly to the sheet in order to minimize the disruption of the incident beam by the oxide particles projected during prior pulses emitted by the laser 13 itself or other lasers 13 in the row.

The number of lasers 13 necessary to treat the entire surface of the strip 3 is minimized by the fact that each laser 13 has an ultra-rapid scanning system, optical or mechanical or combining both principles, which procures a lateral movement of the spot of the ray 14 so as to juxtapose the spots to form a continuous line covering the entire width of the strip 3, preferably with zero or minimal overlap of the spots so as not to risk sending excessive quantities of energy onto the overlapping areas of the spots.

An operating parameter that must also be taken into account is the movement speed of the strip 3, which will determine the frequency of the pulses and/or the scanning speed of the lasers 13. The faster the movement speed is, the higher the frequency and/or scanning speed of the pulses must be, in order to be ensured that a given portion of the width of the surface of the strip 3 is treated by the relevant laser 13 adequately and substantially identically to the other portions. Irrespective of the movement speed, each strip portion in the width must have been treated and must have received the required energy density given by the control unit 15. This energy density will depend on the number of pulses, the energy per pulse, the frequency of the pulses, taking into account the scanning speed necessary to obtain the optimum overlap of the surface of the strip 3.

The use of laser descaling done according to the invention provides the descaling device with great versatility, particularly given that the descaling parameters can easily be adjusted during treatment if it is observed during the operation that they are not optimal. This is for example the case of the surface of the spot of each second laser 13, which a traditional system for adjusting the focus of the ray can make it possible to modify.

One possible simplification of the invention is that instead of positioning a row of first lasers 6 to which an equal number of second lasers 13 corresponds, a smaller number of first lasers 6, or even a single first laser 6, is used, assuming that the oxidation of the surface of the strip 3 is identical in a wide area surrounding a given first laser 6, or even over the entire width of the strip 3 if there is only one laser 6. Groups of second lasers 13, or even all of the second lasers 13 if there is only one first laser 6, are then made to operate with the same parameters.

Near the second lasers 13, means (not shown) are positioned for discharging, and preferably collecting, for example by suction or brushing toward a receptacle, the oxides that have been detached from the surface of the strip 3 as well as the fumes that may be generated during the treatment (by the vaporization of metal particles, oxides or organic materials). In this way, the possibility exists of easily recovering a maximum quantity of these oxides, to prevent them from being dispersed into the ambient atmosphere, polluting it, and to have the possibility of collecting the large majority thereof in order to recover the metals that they contain. Furthermore, this operation makes it possible to get rid of the oxides that may have been only imperfectly detached from the surface of the strip 3 by the lasers 13 (particularly on the upper surface of the strip 3, where gravity cannot be counted on to help detach the oxides). Lastly, suctioning this dust and these fumes makes it possible to avoid damaging optical systems of the lasers on which the latter may become clumped, causing heating or even breaking thereof.

After it passes below the second lasers 13, the strip 3 is therefore in principle completely descaled. This is verified through adequate means, for example using an optical device for inspecting the quality of the descaling such as a camera 16, or a set of such optical devices 16, which examine(s) the surface of the strip 3 over its entire width and determine(s) which areas of the strip 3 may not have been sufficiently descaled. The color differences on the surface of the strip 3 may serve as a basis for this determination. One of the advantages of the suctioning or brushing or equivalent device mentioned above is also that it makes it possible to prevent pieces of oxides that have remained on the upper surface (in particular) of the strip 3 while being detached from wrongly being considered by the camera 16 to still be present and therefore requiring additional descaling to be eliminated.

If the results provided by the optical device 16 are not satisfactory, then it is possible to perform additional descaling for the parts of the strip that have been imperfectly descaled, or for safety, the entire strip.

Thus, in the variant of the invention shown in FIG. 1, downstream from the device(s) for inspecting the quality of the descaling and any aspirators/brushes, a set of third lasers 17 comparable to the second lasers 13 is positioned, which each send a ray 18 onto the areas of the surface of the strip 3 that it has been detected, using the camera 16 or a functionally equivalent device, had been only imperfectly descaled by the second lasers 13. These third lasers 17 can be identical, in their distribution over the width of the strip 3, to the second lasers 13 and also have a system for maintaining the height of the strip (for example, a roll). It is also possible to provide a smaller number thereof, but with spot surfaces of the rays 18 that are wider than for the second lasers 13, such that the ray 18 of a given third laser can for example impact a surface wider than that impacted by the ray 14 of a second laser 13. It is also possible to conceive that the third lasers 17 can be moved laterally, such that they can treat a poorly descaled area that is not situated in line with their nominal position.

It is also possible to provide optical systems on the third lasers 17 making it possible to move their beams laterally without physical movement of the lasers 17. It is thus possible to minimize the number of third lasers 17 that should be used to complete the descaling of the strip 3, in particular if experience has shown that this completion of the descaling is only systematically useful in a limited number of areas.

Optimally, another device for recovering oxides by suction, brushing or other means can also be present near the third lasers 17.

Optimally, means for inspecting the quality of the descaling, such as a camera 19 comparable to the aforementioned camera 16, make it possible to detect any persistent presence of imperfectly descaled areas.

If the descaling of the strip 3 is deemed satisfactory after it has passed below the second lasers 13 or below the third lasers 17 if there are any, the strip 3 can continue its treatment, for example by passing in a skin-pass, then being wound to obtain a coil of cold-rolled and annealed strip, able to be marketed or to undergo other treatments, such as coating.

If the descaling of the strip 3 is still deemed unsatisfactory after it passes below the second lasers 13, then below the third lasers 17 when they are present, it is possible to consider other options while remaining within the scope of the invention.

If the descaling flaws are relatively minor, the treatment of the strip 3 may be continued, but while expecting its surface quality not to be the anticipated quality, and that it will in all likelihood be necessary to declassify it, i.e., to sell it to the client at a price lower than that initially anticipated, or to a client with less strict surface quality requirements than the client that had ordered the strip 3.

If the flaws of the strip 3 are clearly prohibitive at this stage, the part of the strip 3 including them will need to be discarded, or the entire strip 3 will need to be passed through the laser descaling section again, similarly to what is typical in the prior art when one does not have chemical or electrolytic pickling means downstream from the final inspection.

However, another solution may be to provide, on the line, after the laser descaling section, a chemical and/or electrolytic wet pickling bath section that may be filled at least temporarily, to eliminate the observed flaws. If the strip 3 is correctly descaled, these baths remain empty. This alternative solution is shown symbolically in FIG. 1, where the strip 3 may follow a path 20 that orients it toward an electrolytic pickling bath 21, then toward a chemical pickling bath 22. This configuration is of course only one non-limiting example, and this "backup" pickling section can be designed differently, for example by using only one of these two types of baths 21, 22.

Another solution consists of deflecting the strip 3 into the pickling bath(s) 21, 22 using drop rollers, movable vertically and positioned so as to be able to act on the upper surface of the strip 3. During normal operation, these rollers are in a position such that they leave the strip 3 moving outside the pickling bath 21, 22 near which they are positioned. When chemical and/or electrolytic pickling of the strip 3 proves necessary locally, at least one of these drop rollers is lowered so as to bear on the upper surface of the strip 3 and temporarily cause the portion of the strip 3 to be treated to penetrate the corresponding pickling bath(s) 21, 22 that one wishes to use.

Alternatively, it is possible to provide that there are no third lasers 17, and that the strip 3 can be oriented, if necessary, along a path 23 toward the wet pickling section 21, 22 previously described, after its inspection by the camera or optical devices 16 that follow the laser descaling done by the second lasers 13. It is also possible to consider systematically using this wet pickling section 21, 22, so as to be fully ensured that the strip 3 will be in a satisfactory surface condition all over.

The adjustments of the electrolytic pickling section 21, if one exists, may optimally be adjusted based on the results of the inspection by the inspection means 16, 19. It is also possible to consider passing the strip 3 systematically at least in the electrolytic pickling bath 21. When the inspection of the strip 3 by the camera(s) 16, 19 shows that the use of this bath is not useful for a portion of the given strip, the electrolytic pickling bath 21 may be made inactive simply by cutting its power supply.

A final inspection of the surface of the strip 3 when it leaves the wet pickling section 21, 22 can be done to verify the quality of the final result.

Granted, the illustrated solution consisting of using, optionally or systematically, a wet pickling section 21, 22 to correct any imperfections of the descaling by the lasers 13, 17 tends, at first glance, to decrease the financial and ecological interest of this alternative of the invention relative to a device limited to the use of one or several laser descaling operations to clean the strip 3.

However, it must be noted that one of the effects of laser descaling, even if it does not always necessarily allow complete removal of the layer of unwanted oxides present on the strip 3 by itself, is at least to modify the residual part of this oxide layer to make it more homogeneous, and therefore easy to descale using the wet method. The wet pickling operation(s) that are then done by the baths 21, 22 in order to eliminate these residual oxides may use less aggressive baths and/or smaller volumes than if all of the descaling had to be done using a wet pickling method. It must also be taken into account that this potential additional wet pickling may make it possible to avoid declassifying or discarding the metal that was not perfectly treated by the laser descaling section, and therefore to limit the financial impact of these imperfections. It is also possible to conceive of this wet pickling section 21, 22 as being able to completely replace the laser descaling section when the latter must undergo a maintenance operation preventing it from being used. In this way, the descaling line is usable even during this maintenance operation.

Furthermore, the final use of minor wet pickling leads to a surface finish more assuredly comparable to those to which clients are accustomed than in the case of the use of laser descaling alone. This may make the strips 3 thus produced acceptable without reserve by clients as long as they are not convinced that laser descaling alone, properly executed, is sufficient to obtain strips with good surface qualities. Without using pickling baths 21, 22, the surface finishes of the strips 3 having undergone laser descaling only would be new types of finishes that it could be necessary to include in the standards.

As previously stated, the adaptations of the method, as it has been described and illustrated, are obvious for one skilled in the art when he wishes to treat different moving strip products. A very similar device can treat sheets or plates, previously cut from strips or obtained in other manners.

In the case of a treatment of bars, wires or tubes, the various layers and inspecting means are positioned around the surface to be descaled, and the term "row of lasers" that was used for the description of the example of FIG. 1 is of course also valid for this type of application, considering that the word "row" does not involve the relevant lasers being situated only in a same plane parallel to the product to be descaled: they may also be positioned along a path substantially parallel to the perimeter of the product to be treated.

In some cases where the metal products to be treated have a very small width, it would remain within the spirit of the invention to use only one laser in each group of lasers 8, 13, 17 that has been mentioned. One may then choose to focus at least the second and third descaling lasers 13, 17 such that their spots continuously cover the entire surface to be descaled, or to keep spots with small dimensions, but to move these lasers so as to make it possible to treat the entire surface of the product using a single descaling laser per step. This would in particular be particularly suitable for the treatment of wires with small diameters. Of course, the movement speed of the lasers will in particular depend on the movement speed of the product to be descaled.

In the case of the treatment of welded tubes, emphasis may in particular advantageously be placed on the laser descaling at the weld seam, which is the part likeliest to have undergone significant surface oxidation, by choosing particular adjustments for the second laser(s) 13 treating it.

Regarding the second and third lasers 13, 17 usable to carry out the method according to the invention, it is in particular possible to use:

Optical systems that make it possible to generate, for each laser 13, 17, a thin strip several centimeters long; scanning is then not necessary and the frequency and energy of the pulses are varied based on the indications from the control unit 15 to obtain the required energy density as a function of the actual speed of the strip 3;

Or polygonal scanners that create a scanning movement of the rays 14, 18 coming from the lasers 13, 17, with scanning speeds that may exceed 200 m/s.

It is for example possible to use Nd:YAG lasers 13, 17 delivering pulses of 1 mJ or 100 mJ. The dimensions of the spots (the spots of the pulses on the strip) are determined by their power. Conversely, by unfocusing the pulses or by using optical systems, in a known manner, it is possible to cause them to diverge or converge more, and therefore to change the sizes of the spots.

A 1 mJ laser has a power of 1000 W for a frequency of 1 MHz or 500 W for frequency of 500 kHz and a fixed spot diameter of 114 µm, or a higher spot diameter that is also variable if optical means or means for unfocusing the pulse are used to that end. A 100 mJ laser has a power of 1000 W for a frequency of 10 kHz or 500 W for frequency of 5 kHz, and a spot dimension that is easily adjustable by varying the focus of the beam, which may be around a mm.

The 1 mJ laser therefore generally has a smaller spot than a 100 mJ laser. This is explained by the fact that passing a high quantity of energy in a small pulse would cause excessive heating of the fiber. The shape of the pulse is also different, the pulse from the 1 mJ laser being conical while that of the 100 mJ laser is normally cylindrical (but unfocusing may allow it to be made conical). Indeed, a high quantity of energy is obtained to the detriment of the quality of the beam, hence the difference in shape and dimensions between the two described types of lasers.

Multiple mechanisms are involved in the laser descaling method: vaporization of the oxide under the effect of heat, modification of the metal/oxide interface by the shockwave due to the pulses, and thermal expansion unsticking the oxide. The article "Preliminary study on the laser cleaning of stainless steels after high temperature oxidation/Pandora Psyllaki, Roland Oltra", *Materials Science and Engineering A* 282 (1-2, pp: 145-152, April 2000, addresses this aspect. It is also possible to add the effect of restructuring of the oxide, which becomes homogeneous under the effect of the laser and may thus be removed more easily and reliably, whether directly by the various lasers, or by pickling baths that follow them and that are less bulky or less aggressive than when they must perform the whole descaling by themselves.

The reference information that must be stored in the processing unit 10 includes the spectral emissivity measurements in the direction to be considered and the total hemispherical emissivity as a function of the composition of the strip, its temperature and its dimensions (thickness, width) and the orientation of the laser beam (for the directional emissivity).

Thus, for example, for strips measuring 1500 mm wide and 0.78 mm thick made from austenitic stainless steel 304L and for strips measuring 1250 mm wide and 1.46 mm thick made from austenitic stainless steel with Mo 316L, examples of data to be stored as references for oxidized strips in the treatment unit 10 is provided in table 1, this data having been determined experimentally.

Based on the studied grades and the different oxide thicknesses, the parameters of the laser, for example a Nd:YAG-1 mJ pulsed laser, must make it possible to remove the oxide layers based on their nature. The degradation thresholds of the oxides for pulses of 120 ns are comprised between 1 and 5 J/cm$^2$. The distribution of the pulses on the surface is adaptable, but to have an ideal overlap in the described example, a quasi-zero overlap has been chosen between two pulses in the scanning direction, and a 75% overlap between two pulses in the movement direction of the strip 3 (a given area of the strip in which this overlap takes place is therefore affected by the spots with four pulses). Under these conditions, the fluence per applied pulse must in general be comprised between 1 and 20 J/cm$^2$ for each spot (based on the natures and thicknesses of the oxides to be removed). In this example, it is between 2 and 11 J/cm$^2$. It is then possible to remove an oxide thickness on the surface, for example, of a 316L or 304L stainless steel, from about several tenths of a µm to several µm.

The fluence per pulse applicable in the case of any third lasers 17 is typically of the same order of magnitude (1 to 20 J/cm$^2$) as for the second lasers 13. It may in actuality often be lower, since normally, the majority of the descaling will already have been done by the second lasers 13. Optimally, however, it is preferable for the third lasers 17 to be able to procure the same fluence per pulse as the second lasers 13 so that they can, by themselves, ensure complete descaling of the portions of the surface of the product that an imperfect adjustment of the second lasers 13 has left not descaled due to a lack of overlap of the spots of two successive pulses.

The 304L strips have been obtained as follows: hot rolling to a thickness of 3 mm, annealing, then chemical pickling on a first annealing line, then cold rolling on a roller of the Sendzimir type (20 cylinders) to a thickness of 0.78 mm in a single pass, annealing on a second line at a temperature of up to 1120° C. for 1 minute and 6 seconds with a travel speed of 77 m/min, leading to an oxide layer with a thickness of about 250 nm.

The 316L strips have been obtained as follows: hot rolling to a thickness of 3 mm, annealing, then chemical pickling on a first annealing line, then cold rolling on a four-high emulsion rolling mill to a thickness of 1.46 mm, annealing on a second line at a temperature of up to 1150° C. for 1 minute and 16 seconds with a travel speed of 67 m/min, leading to an oxide layer with a thickness of about 250 nm.

TABLE 1

Directional emissivities measured experimentally for two types of oxidized strips

| Directional spectral emissivity (at 20° C., 1064 nm) | 304 L, 1500 mm wide, 0.78 mm thick, oxidized strip | 316 L, 1250 mm wide, 1.46 mm thick, oxidized strip |
| --- | --- | --- |
| 12° | 0.878 | 0.742 |
| 24° | 0.880 | 0.749 |
| 36° | 0.875 | 0.742 |
| 48° | 0.877 | 0.761 |
| Total hemispherical emissivity at 1150° C. | 0.367 | 0.535 |

The lasers can also be used with the help of an optical system transforming the pulse into a line, or using a polygonal scanner.

If an optical system is used transforming the pulse into a line, if a 100 mJ laser is used with a spot area of 1.4×1.4 mm, or 1.96 mm², on a strip normally moving at 100 m/min, to have a laser operating on a 15 cm line, this spot area requires a spot width of 0.013 mm, that is 13 µm. If the strip travels at 100 m/min, it travels 13 µm in 0.0078 ms. For the spot to cover the entire targeted surface, it is therefore necessary to have a pulse every 0.0078 ms, which corresponds to 128 kHz for a total power of the lasers of 12.8 kW. Twelve lasers are therefore needed to that end for a strip 1500 mm wide.

If one wishes for each laser to work on a 10 cm line, the spot width must be 20 µm according to the same calculation as before. Still for a nominal speed of the strip of 100 m/min, a frequency of 85 kHz is necessary, corresponding to a total power of 8.5 kW. Thirteen or fourteen lasers are therefore needed for a strip 1500 mm wide. Twenty would be needed for a strip 2000 mm wide.

If a polygonal scanner is used, it is necessary to redo the previous calculation, calculating the necessary scanning speed to have at least the entire treated surface in the travel direction and in the width of the strip. If a pulse of 1.4 mm per side is used, on a strip traveling normally at 100 m/min, to have a laser working over 15 cm, the polygonal scanner must be capable of traveling twice this distance when the strip is moved by 1.4 mm, or at a speed of 360 m/s. The frequency of the laser must be able to provide a row of pulses juxtaposed in the direction of the scan, or a little less than 260 pulses going one way, or about 600 kHz.

Under these conditions, it was possible to obtain a very good descaling of the 304L and 316L oxides, not requiring subsequent chemical or electrochemical pickling.

The parameters to be taken into account to control the second and third lasers 13, 17, and which must account for the nature of the product to be treated (composition, width) and its history (annealing parameters during which most of the oxide layer to be descaled was formed, roughness imposed by the cylinders of the hot or cold roller), in addition to the emissivity that the first lasers 6 and the associated sensors 8 made it possible to measure, are in particular:

The movement speed of the strip;
The power of the laser;
The duration of the pulses;
The frequencies of the pulses;
The strip width that each laser must treat;
The movement speed (mechanical and/or optical) of the spots of the lasers.

The measured emissivity is preferably compared with the theoretical standard value in the treatment unit 10 that the nature of the product and its history have a priori imposed. If the result is substantially different from the anticipated result, thus showing that the formation of the oxides did not take place exactly as expected, then it is possible to apply a corrective factor to one or several of the operating parameters of the second lasers 13 so as to adapt these parameters to the actual conditions encountered. The camera 16, or the equivalent device, makes it possible to ensure that the correction to the prerecorded adjustments were effective enough, and if not, to command the third lasers 17 accordingly or to deflect the product directly toward the pickling baths 21, 22. It is thus possible to limit the use of pickling baths 21, 22 in addition to or in place of the third lasers 17 as much as possible to correct the imperfections of the previous step for descaling done by the second lasers 13.

If, to simplify the programming of the treatment unit 10 and the modeling and learning process, one does not wish to incorporate the possibility of contributing such corrective factors therein, it is of course possible to settle for basing oneself solely on the camera 16, the third lasers 17 and/or the pickling baths 21, 22 to correct the possible imperfections of the treatment by the second lasers 13.

The invention claimed is:

1. A method for laser descaling of a moving metal product having an oxidized surface, said method using laser descaling with at least one descaling laser, comprising:
   emitting, by at least a first laser with a wavelength equal to a wavelength of the descaling laser, an emitted ray that is reflected on the oxidized surface of the metal product to be descaled, said ray reflected by the oxidized surface being detected by sensors that send information they collect into a processing unit;
   calculating, by the processing unit, an absorption of the emitted ray by the oxidized surface, from the information collected by the sensors, deducing, by the processing unit, an emissivity of the oxidized surface in the direction of said reflected rays, and correlating, by the processing unit, the emissivity with reference information prerecorded inside the processing unit;
   sending, by the descaling laser, pulses from a descaling ray onto the oxidized surface to descale the oxidized surface, said pulses of said descaling ray generating spots that cover the entire oxidized surface to be descaled using optical and/or mechanical scanning laterally moving the spots of the descaling rays on the oxidized surface, or using an optical system transforming the spots in lines, said descaling laser being controlled by a control unit receiving information provided by the processing unit to determine operating parameters to be imposed on said descaling lasers to obtain the descaling of the oxidized surface, by comparing the information provided by the processing unit with experimental results prerecorded in the control unit; and
   inspecting the descaled surface of the metal product to verify an effectiveness of the descaling by detecting any persistence of areas that have not been descaled, or that have been descaled poorly.

2. The method according to claim 1, wherein a fluence of the spot of each pulse of said descaling laser is comprised between 1 and 20 J/cm².

3. The method according to claim 1, wherein the reference information prerecorded in the processing unit includes a composition of the metal product and a roughness, measured or estimated, of the oxidized surface.

4. The method according to claim 1, wherein after the descaling and before the inspection of the surface, descaled oxides are discharged from the surface of the metal product.

5. The method according to claim 1, wherein after inspecting the surface of the metal product, additional descaling of the metal product is performed, at least in areas for which the inspection has shown that the descaling by the descaling laser was insufficient.

6. The method according to claim 5, wherein said additional descaling is carried out by at least one additional laser from a group of additional lasers.

7. The method according to claim 6, wherein second inspection means, such as optical means (19), are used to verify an effectiveness of said additional descaling.

8. The method according to claim 7, wherein the metal product, after the additional descaling and optionally the detection of areas imperfectly descaled by the second inspection means, is sent into at least one chemical or electrolytic pickling bath.

9. The method according to claim 5, wherein said additional descaling is done using at least one chemical or electrolytic pickling bath.

10. The method according to claim 1, wherein said moving metal product is a strip or a sheet, and in that the strip or sheet is descaled on both faces of said strip or sheet.

11. A device for laser descaling of a moving metal product, the device comprising:
at least one first laser such a group of said first lasers, each sending an emitted ray that is reflected on the oxidized surface of the metal product to be descaled, and sensors that detect reflected rays reflected by said oxidized surface and send information collected into a processing unit;
the processing unit that calculates an absorption of the emitted ray by the oxidized surface of the metal product, from the information collected by the sensors, and that deduces an emissivity of the oxidized surface of the metal product, and correlates this emissivity with reference information prerecorded inside the processing unit;
at least one descaling laser such that a group of such descaling lasers with a wavelength equal to a wavelength of the first lasers, that each send a descaling ray onto the oxidized surface of the metal product to descale the oxidized surface, said descaling rays generating spots able to cover the entire oxidized surface to be descaled using optical and/or mechanical scanning systems laterally moving the spots of the descaling rays on the oxidized surface, or an optical system transforming the spots in lines, a control unit controlling said descaling lasers and receiving information provided by the processing unit to determine operating parameters to be imposed on said descaling lasers to obtain the descaling of the oxidized surface of the metal product, by comparing the information provided by the processing unit with experimental results prerecorded in the control unit, and controlling said descaling lasers by imposing said operating parameters on said descaling lasers; and
means for inspecting the descaled surface of the metal product verifying an effectiveness of the descaling by detecting any persistence of areas that have not been descaled, or that have been descaled poorly.

12. The laser descaling device according to claim 11, wherein said means for inspecting the descaled surface of the metal product are optical means.

13. The laser descaling device according to claim 11, including means for discharging descaled oxides from the surface of the metal product, for example by suction and/or brushing.

14. The laser descaling device according to claim 11, including means for performing additional descaling placed downstream from said means for inspecting the descaled surface of the metal product.

15. The laser descaling device according to claim 14, wherein said means for performing additional descaling include at least one additional laser such a group of such additional lasers, operating according to information provided by said means for inspecting the descaled surface of the metal product.

16. The laser descaling device according to claim 14, wherein said means for performing additional descaling include at least one chemical or electrolytic pickling bath.

17. The laser descaling device according to claim 11, wherein the laser descaling device is placed on a continuous treatment line including a furnace placed before said laser descaling device.

18. The laser descaling device according to claim 17, wherein said continuous treatment line includes a rolling device for the metal product.

19. The laser descaling device according to claim 11, wherein, to treat both faces of said metal product, which consists of a moving strip or sheet, the laser descaling device includes, on either side of said metal product, at least one of said first lasers, at least one of said descaling lasers, and said means for inspecting each surface of said metal product.

20. The laser descaling device according to claim 11, wherein, to treat the entire surface of said metal product, which consists of a bar, a tube or a wire, the laser descaling device includes, distributed near the periphery of said metal product, a group of first lasers, a group of descaling lasers, and said means for inspecting the entire surface of said metal product.

* * * * *